Feb. 20, 1934.   B. F. MIESSNER   1,948,307
ELECTRICAL RECTIFYING AND FILTERING SYSTEM
Filed Nov. 7, 1929   2 Sheets-Sheet 2

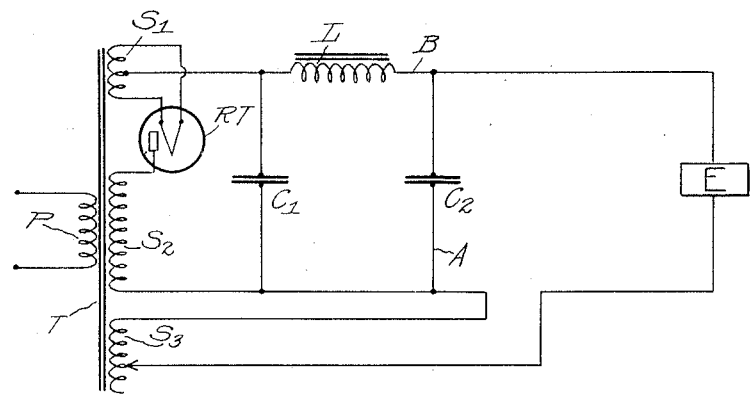
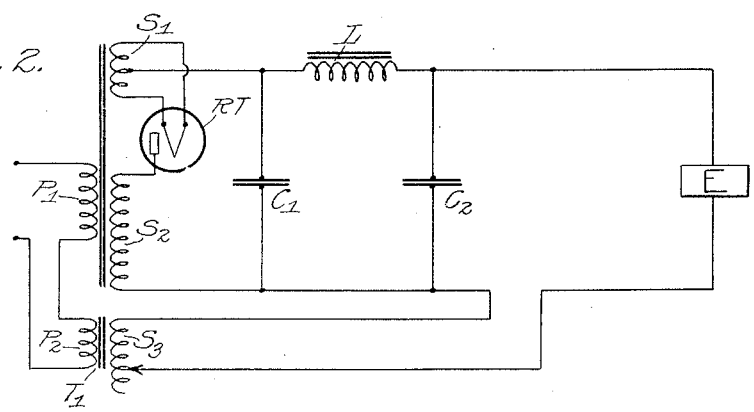
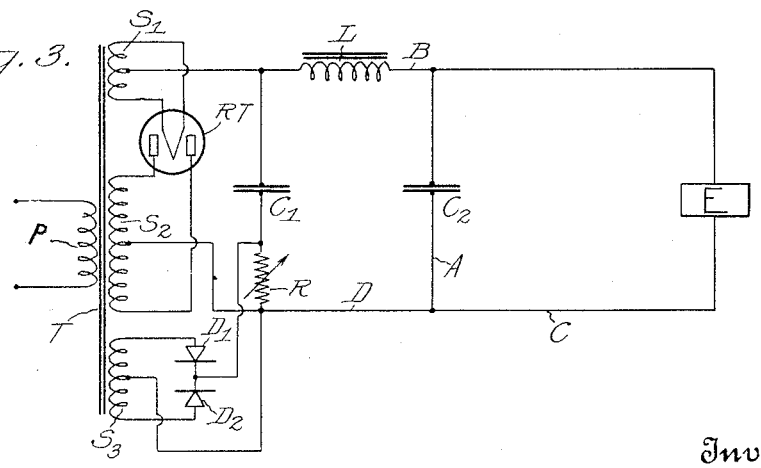

Fig. 4.

Inventor
BENJAMIN F. MIESSNER

WITNESS

By Attorney

Patented Feb. 20, 1934

1,948,307

UNITED STATES PATENT OFFICE 1,948,307

ELECTRICAL RECTIFYING AND FILTERING SYSTEM

Benjamin F. Miessner, Short Hills, N. J., assignor, by mesne assignments, to Radio Corporation of America, New York, N. Y., a corporation of Delaware Application November 7, 1929. Serial No. 405,320

11 Claims. (Cl. 250—27)

The present invention relates to electrical rectifying and filtering systems, and more particularly to such a system including means for neutralizing the alternating current component from the output thereof.

The invention is described with the aid of the figures of the accompanying drawings in which like reference characters represent like parts in the several figures so far as possible.

Fig. 1 illustrates in diagram a rectifying and filtering system including one embodiment of my invention, and Fig. 2 is a modification thereof.

Fig. 3 illustrates in diagram a system including a rectifier different from that in Fig. 1 and including a modified embodiment of my invention adapted to function with the different rectifier.

Fig. 4 is a modification of the arrangement shown in Fig. 3 and includes an amplifier including a plurality of electron tubes energized therefrom.

Referring to Figs. 1 and 2, I show an alternating current source supplying a rectifying and filtering system through a transformer T having primary winding P, a secondary winding $S_1$ for heating the filament of a single wave rectifier tube RT, and a secondary winding $S_2$ for supplying current to be rectified. The filter is shown to include the usual choke coil L and filter condensers $C_1$ and $C_2$, and connected to a load E, such for example as the plate circuits of a cascaded series of three electrode vacuum tubes of an amplifier.

With the single wave rectifier RT the filter will supply a unidirectional current to load E having a rippling component of the same frequency as the frequency of the source of supply. For example, with a supply of 60 cycle commercial alternating current the ripple will be mainly a 60 cycle one. To neutralize this ripple I introduce into the system an alternating current of phase opposed thereto through a secondary winding $S_3$; providing for controlling the amplitude of this opposing current in some suitable manner, as by fixing the number of turns of secondary $S_3$ as indicated by a variable contact, but of course the correct number of turns can be determined and fixed in a given design. The current thus introduced is of the same frequency as the ripple component in the filter system, and the opposing phase is readily obtained by selecting proper polarity of connections of winding $S_3$. Winding $S_3$ may be connected into the filter system at points other than as shown, as for example at such points as those marked A and B.

Fig. 2 differs from Fig. 1 in that a separate transformer $T_1$ is employed for developing the potential in secondary $S_3$ for opposing the rippling component in the filtered current. The primary $P_2$ of this separate transformer is shown connected in series with primary $P_1$ of the main transformer, though it may be connected in parallel relation.

A separate transformer is of advantage in case the rippling component of the filtered current has considerable energy in a 120 cycle harmonic or higher harmonics, for the separate neutralizing transformer may be designed to produce these harmonics also, as by designing the core thereof so that the filtered current passing through secondary $S_3$ will saturate the core sufficiently to produce the desired harmonic producing distortion.

In Figs. 3 and 4, I show the rectifier RT of the so-called full wave form which develops a rippling component of double the frequency of the supply source; that is, 120 cycles for a 60 cycle supply. As in Fig. 1 the filter system includes cross-connected condensers $C_1$ and $C_2$ on opposite sides of filter choke coil L, the filter feeding a load E. A second full wave rectifier system comprising rectifier elements $D_1$ and $D_2$ supplied from secondary $S_3$ develops across resistance R a double frequency ripple voltage, connected to be opposed in phase to the double frequency ripple voltage in the filtered current, and may be adjusted by selection of transformer characteristics and value of resistance R to be equal to the filter current ripple.

This low voltage neutralizing rectifier system may be connected in circuit with the main system at points other than as shown, as for example the indicated points A, B, C and D.

The high voltage rectifier RT may be of any suitable type, vacuum tube and gas filled tubes being usual. The low voltage rectifiers $D_1$ and $D_2$ may also be of any type, but the so-called cuprous oxide and like fixed rectifiers are quite suitable for the low voltage operation involved.

In Fig. 4, I have shown the rectifiers $D_1$ and $D_2$ of Fig. 3 replaced by a full wave rectifier RT' energized by the secondaries $S'_1$ and $S'_2$ in a manner similar to the energization of the tube RT. The output of the rectifier RT' is provided with filter condensers $C'_1$ and $C'_2$ and filter choke coil L', and L neutralize out the ripple component flowing in either filter system by properly coupling the choke coils L and L' together.

In the structure shown in Fig. 3, the direct current component of the rectifier system $S_3$, $D_1$, $D_2$, R is not utilized. In the structure of Fig. 4, I have utilized the direct current component of the rectifier RT' to energize a pair of tubes VT and VT' arranged in push-pull relation by means of the secondary of an interstage transformer $T_1$ and the output transformer OT, the proper grid bias for these tubes being obtained from the potential drop across a bias resistor and shunting condenser.

The primary of the transformer $T_1$ is included in the plate circuit of an audio amplifier system including two transformer coupled cascaded tubes $VT_2$ and $VT_3$ energized from the rectifier RT, the input transformer of this system being indicated at IT. The proper grid bias of these two tubes is obtained from bias resistors and shunting condensers $BR_2$ and $BR_3$ respectively. The voltage applied to the plate of tube $VT_3$ is regulated by means of a series resistance PR, the plate current of each tube $VT_2$ and $VT_3$ being filtered by condensers $FC_2$ and $FC_3$ respectively.

Tubes VT and VT' are the directly heated cathode type of tube, the filaments of which are provided with a center tap potentiometer and supplied with heating current from the secondary $S_4$ of the transformer T.

I have shown tubes $VT_2$ and $VT_3$ as of the indirectly heated cathode type, heating current being supplied from a secondary $S_5$ of the transformer T, but it is to be understood that these may be replaced by tubes of the directly heated cathode type as described and claimed in my Patent 1,718,059 issued June 18, 1929 without departing from the spirit of my invention.

While I have illustrated and described my invention in connection with particular adaptations thereof, no limitations are intended by reason of such choice for explanatory purposes, various other adaptations such as using a coupling element, for example, a transformer, independent of the choke coils $L_1$, $L_2$, coupled into the filter circuit in the same manner as that described with reference to the resistance R, or coupling one of the choke coils L, $L_1$ to a secondary inserted in legs A, D, of either filter, being readily apparent to those skilled in the art.

This application is a continuation in part of my application Serial Number 344,884, filed March 6, 1929.

Having thus described my invention, I claim:—

1. In an amplifier system the combination of a series of cascaded amplifier tubes, a source of alternating current energy, a plurality of rectifiers coupled to said source, filter systems for each of said rectifiers, means coupling said filter systems for the neutralization of the rippling components of current output of each of said rectifiers and connections for energizing some of the tubes of said cascade from one of said rectifiers and for energizing others of said tubes from another of said rectifiers.

2. In an amplifier system the combination of a series of cascaded amplifier tubes, a source of alternating current energy, a plurality of full wave rectifiers coupled to said source, filter systems for each of said rectifiers, means coupling said filter systems for the neutralization of the rippling components of current output of each of said rectifiers and connections for energizing some of the tubes of said cascade from one of said rectifiers and for energizing others of said tubes from another of said rectifiers.

3. In a signal receiving system, an electron tube amplifier, an alternating current power supply line, independent rectifier circuits connected with said power supply line, separate filter circuits connected with said independent rectifier circuits, a load circuit, connections between one of said filter circuits with said load circuit, independent connections between the other of said filter circuits and the power circuits of said electron tube amplifier, and means interconnecting said filter circuits for opposing the effects of energy fluctuations in one filter circuit with the effects of energy fluctuations in the other filter circuit for eliminating the effects of power noises in the circuits of said electron tube amplifier.

4. In a signal receiving system, an electron tube amplifier, an alternating current power supply line, independent rectifier circuits connected with said power supply line, separate filter circuits connected with said independent rectifier circuits, a load circuit, connections between one of said filter circuits with said load circuit, independent connections between the other of said filter circuits and the power circuits of said electron tube amplifier, and coupling impedances connected between said filter circuits for opposing the effects of energy fluctuations in one filter circuit with the effects of energy fluctuations in the other filter circuit for substantially eliminating the effects of power noises in the circuits of said amplifier.

5. In a signal receiving system, an electron tube amplifier, an alternating current power supply line, independent rectifier circuits connected with said power supply line, separate filter circuits connected with said independent rectifier circuits, a load circuit, connections between one of said filter circuits with said load circuit, independent connections between the other of said filter circuits and the power circuits of said electron tube amplifier, and circuits interconnecting said filter circuits for transferring energy fluctuations from one filter circuit to the other filter circuit displaced in phase substantially 180° for eliminating the effects of power noises in the circuits of said electron tube amplifier.

6. In a signal receiving system, an electron tube amplifier, an alternating current power supply line, independent rectifier circuits connected with said power supply line, separate filter circuits connected with said independent rectifier circuits, a load circuit, connections between one of said filter circuits with said load circuit, independent connections between the other of said filter circuits and the power circuits of said electron tube amplifier, and means interconnecting the output of one filter circuit with the output of the other filter circuit for substantially annulling the effects of energy fluctuations in said filter circuits and eliminating power noises in the circuits of said electron tube amplifier.

7. In a signal receiving system, an electron tube amplifier, an alternating current power supply line, independent rectifier circuits connected with said power supply line, separate filter circuits connected with said independent rectifier circuits, a load circuit, connections between one of said filter circuits with said load circuit, independent connections between the other of said filter circuits and the power circuits of said electron tube amplifier, and means interconnecting the output circuits of said filter circuits and adapted to transfer alternating current components of energy between said filter circuits while preventing the passage of direct current for opposing the effects of alternating current fluctuations in one filter circuit with respect to alternating current fluctuations in the other filter circuit for substantially annulling the effects of power noises in the circuits of said electron tube amplifier.

8. In a power supply system, an alternating current power supply line, independent rectifier circuits connected with said power supply line, filter circuits connected with each of said rectifier circuits, separate load circuits, and means interconnecting the output circuits of said filter circuits and adapted to transfer alternating current components of energy between said filter circuits while preventing the passage of direct current therebetween for opposing the effects of alternating current fluctuations in one filter circuit with respect to alternating current fluctuations in the other filter circuit, for substantially annulling the effects of power fluctuations in the load circuits.

9. In a power supply system, an alternating current power supply line, independent rectifier circuits connected with said power supply line, filter circuits connected with each of said rectifier circuits, separate load circuits and a transformer coupling one of said filter circuits with the other for transferring alternating current components of energy in opposed phase relation between said filter circuits for annulling the effects of power fluctuations in said load circuits.

10. In a power supply system, an alternating current power supply line, independent rectifier circuits connected with said power supply line, filter circuits connected with each of said rectifier circuits, separate load circuits, and an impedance comprising a pair of inductances coupled one to the other, one of said inductances being disposed in series in one of said filter circuits and the other of said inductances being connected in series in the other of said filter circuits said inductances being adapted to transfer alternating current components of energy in opposed relation between said filter circuits for annulling the effects of power fluctuations in said load circuits.

11. In a power supply system, an alternating current power supply line, independent rectifier circuits connected with said power supply line, filter circuits connected with each of said rectifier circuits, separate load circuits, and an impedance comprising a pair of inductances coupled one to the other, one of said inductances being disposed in series in one side of one of said filter circuits and the other of said inductances being connected in series in the corresponding side of the other of said filter circuits for transferring alternating current components of energy in opposed phase relation between said filter circuits for annulling the effects of power fluctuations in said load circuits.

BENJAMIN F. MIESSNER.